United States Patent [19]

Grilli et al.

[11] 4,456,041

[45] Jun. 26, 1984

[54] APPARATUS FOR FILLING AND SEALING A LUBRICANT RESERVOIR

[75] Inventors: Walter Grilli, Modena; Aldo Crotti, Castelvuovo Rangone; Orlando Berselli, Vignola, all of Italy

[73] Assignee: Italtractor I.T.M. S.p.A., Castelvetro, Italy

[21] Appl. No.: 262,507

[22] Filed: May 11, 1981

[30] Foreign Application Priority Data

Jun. 26, 1980 [IT] Italy .................... 40053 A/80

[51] Int. Cl.$^3$ .............................................. B65B 7/28
[52] U.S. Cl. ......................................... 141/329; 53/264; 53/324; 138/89; 184/109
[58] Field of Search ....................................... 141/1–12, 141/65, 66, 19, 329, 330; 53/264, 324; 138/89; 184/1 R, 80, 88 R, 88 A, 89, 105 R

[56] References Cited

U.S. PATENT DOCUMENTS 2,855,006 10/1958 Geisler .................... 141/329

FOREIGN PATENT DOCUMENTS 112401 4/1975 Fed. Rep. of Germany .

Primary Examiner—Houston S. Bell, Jr.
Attorney, Agent, or Firm—Browdy and Neimark

[57] ABSTRACT

The invention's application is suited in particular to the lubricated turning pairs of crawler tracks. It makes provision for the sealing of the lubricant reservoir by means of an elastomer plug, and for the introduction of a needle into and through the plug. The needle serves to effect evacuation of any existing air from within the reservoir, and the subsequent introduction of lubricating oil. The needle is then withdrawn from the plug which, by virtue of the elastic properties of the elastomer, automatically re-encloses the puncture produced by the needle.

11 Claims, 13 Drawing Figures

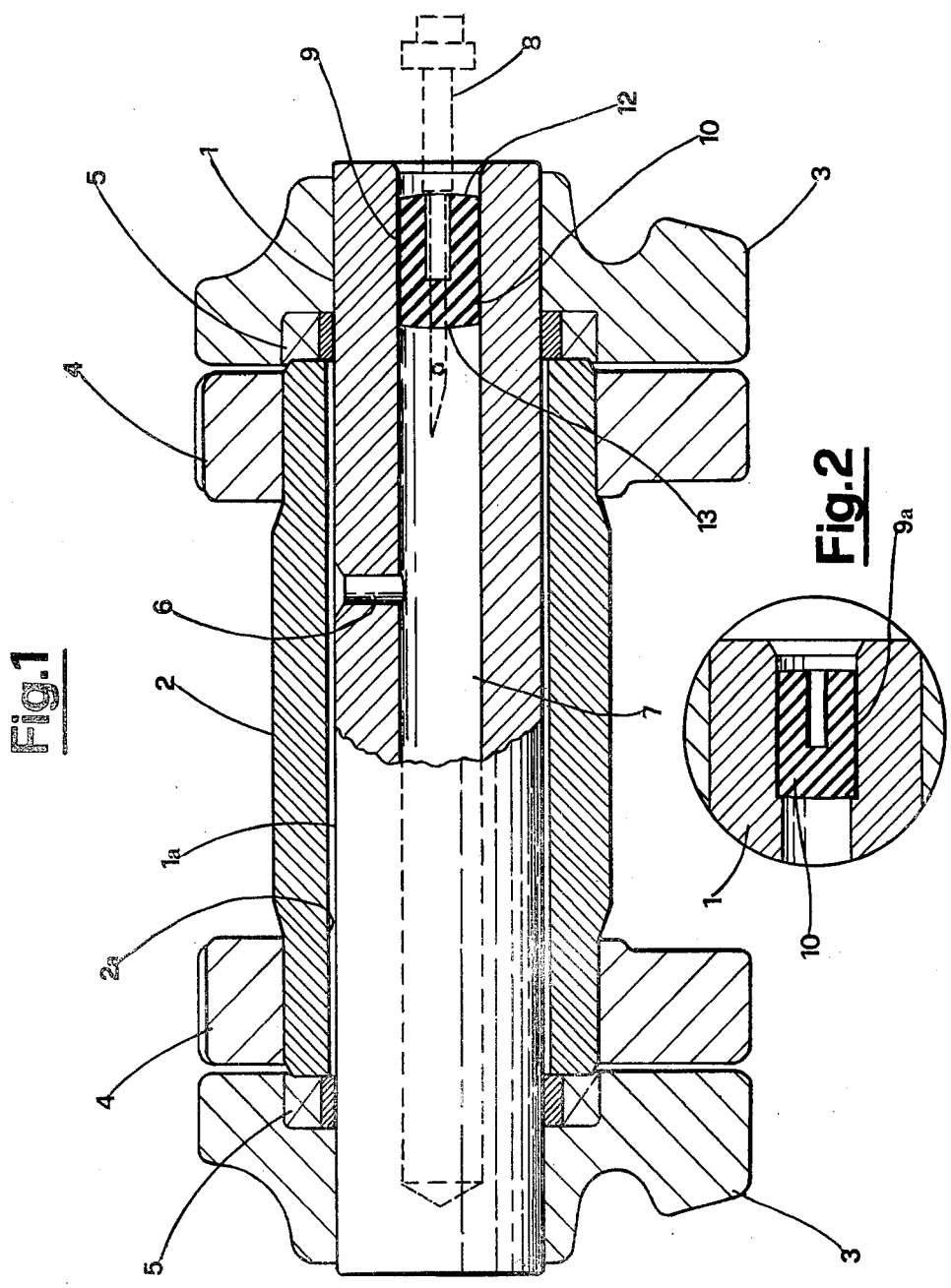

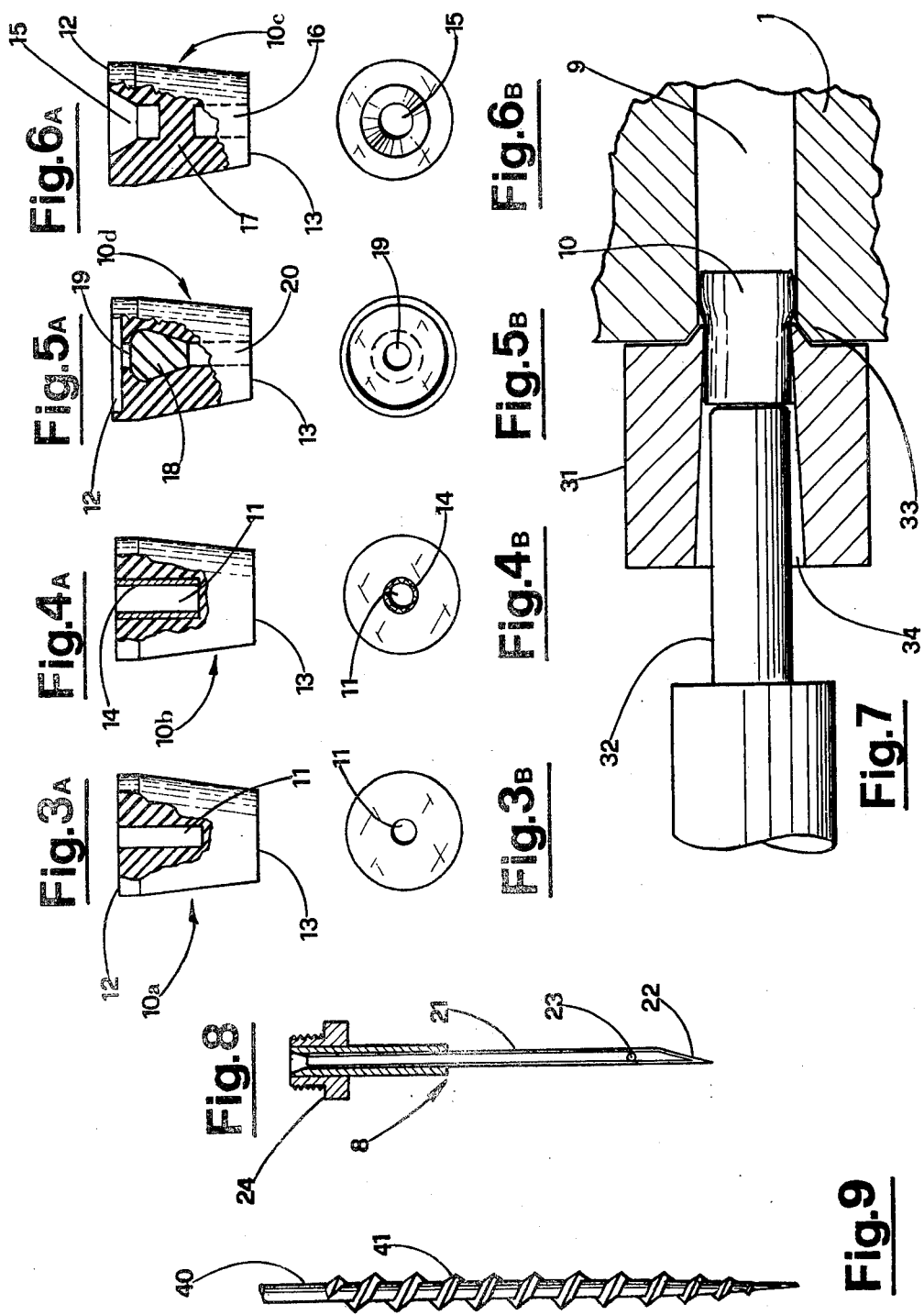

APPARATUS FOR FILLING AND SEALING A LUBRICANT RESERVOIR

BACKGROUND OF THE INVENTION

The invention herein described concerns a process and means for the filling and sealing of the lubricant reservoir located within the pivot of lubricated turning pairs in particular track link pivots and crawler track rollers.

These said turning pairs are those constituted either by a pivot-bush arrangement which provides the special articulated coupling between the spaced pairs of links which carry the track's members, or those constituted by roller-support pivot couplings in the track's guide rollers, or the rollers of a belt stretcher.

For some time now there have been lubricated turning pairs, that is, turning pairs having within the pivot a coaxially disposed cylindrical enclosure serving as a reservoir for viscous lubricating oil, which reservoir communicates with the coupling's surface areas thus maintaining them in constant lubrication. The actual filling of the said reservoir is achieved by the ejection of the lubricating oil from an appropriately designed nozzle, and, once the nozzle has been removed, subsequent insertion of a screwed or forced plug in order to seal the reservoir mouth.

Such a series of operations poses certain problems, due mainly to the fact that it is necessary both to expel the air from the reservoir and the parts to be lubricated in order to make way for the lubricating oil and, after the filling stage, to ensure rapid closure of the reservoir mouth so as to prevent any loss of lubricating oil from the reservoir.

SUMMARY OF THE INVENTION

The main object of the invention herein described is is precisely that of providing a process, and relative means, for filling and sealing the lubricant reservoir which, by overcoming the aforementioned difficulties, will permit both the complete extraction of the air from within the reservoir and its subsequent filling with lubricating oil, and the elimination of those difficulties inherent in combining the filling and sealing operations.

Another object of the invention herein described is that of supplying the appropriate means,—in particular the plugs—, which are efficient, economical, and extremely reliable.

A further object of the invention herein described is that of providing means,—in particular the plugs—, which are easily removed even after extensive use and replaced without difficulty.

These and other objects are obtained by the process to which the invention herein described refers, and by the relative means, characterised by the fact that it comprises the following stages:
  sealing of the lubricant reservoir by means of an elastomer plug forced into the reservoir mouth;
  provision for lubrication by way of a needle inserted through the plug in such a way that its extremity gains the interior of the reservoir;
  introduction of the lubricant into the reservoir through the said needle;
  withdrawal of the needle from the plug;
the said plug and the said needle being such that once the needle has been withdrawn from the plug, the elastic quality of the material constituting the plug will cause re-enclosing of the puncture produced by the needle.

BRIEF DESCRIPTION OF THE DRAWINGS

Further characteristics and advantages will emerge more clearly from the detailed description which follows of a process and relative means to which the invention herein described refers with the aid of the enclosed drawings, in which:

FIG. 1 shows the longitudinal cross-section of a turning pair through which four track links are coupled and into which may be inserted a plug and needle of the kind to which the invention refers.

FIG. 2 shows a differing form of embodiment of the plug's seat in larger scale than that of FIG. 1.

FIG. 3a 4a 5a 6a show lateral cutaways of further forms of embodiment of the plug to which the invention refers.

FIG. 3b 4b 5b 6b show plans of the respective embodiments as illustrated in FIG. 3a 4a 5a 6a.

FIG. 7 shows a longitudinal cross-section of the means for forced insertion of the plug into the reservoir.

FIG. 8 shows a longitudinal cross-section of the needle (8).

FIG. 9 shows a detail of the means for withdrawal of the plug.

DESCRIPTION OF THE PREFERRED EMBODIMENTS

In FIG. 1 a pivot (1) is indicated, coupled with a bush (2) so as to form a turning pair.

The track has one pair of links (3) incorporated onto the extremities of the pivot (1) and another pair of links (4) incorporated onto the extremities of the bush (2).

The coupling of the pivot (1) to the bush (2) allows the two pairs of links (3) and (4) an inter-related rotation.

The surface areas requiring lubrication are the internal cylindrical surface (2a) of the bush (2) aperture, and that external cylindrical surface (1a) of the pivot (1) which couples with the bush aperture.

These two coupling surfaces are enclosed laterally by suitable sealing components (5) positioned at the extremities of the bush (2) and let into an appropriately shaped housing located in the inner wall of the (outer) links (3).

These sealing components (5) act to prevent the outflowing of lubricating oil from the surface areas (1a and 2a) of the coupling.

These surface areas of the coupling communicate with a cylindrical chamber located within and coaxially disposed to the pivot (1) by means of one or more conduits (6) located at varying positions in the pivot's longitudinal plane, which cylindrical chamber constitutes the reservoir (7) for the lubricating oil.

The chamber's (7) open extremity, (which constitutes the reservoir mouth (9)) is sealed by means of an appropriately shaped elastomer plug (10).

The process, to which the invention herein described refers, provides for the following procedures:

(a) introduction of the plug (10) into the reservoir mouth (9), by means of the appropriate pushing agent, in such a way that the plug remains forced into the actual seat thus sealing the reservoir (7).

(b) introduction of the needle (8) into and completely through the plug so that the needle's actual point gains the interior of the reservoir (7).

(c) extraction,—by use of the appropriate means of suction connected to the needle (8)—, of the air contained in the reservoir and in all such spaces as are destined to receive the lubricating oil (these being the conduits (6) and the space enclosed by the coupling's two surface areas (1a and 2a).

(d) subsequent introduction through the needle (8) of the requisite quantity of lubricating oil into the reservoir (7)—being sufficient to fill the reservoir and the other foreseen spaces.

(e) withdrawal of the needle from the plug.

The material used for the plug (10) should be such that, with respect to both the compression it undergoes through its being forced into the reservoir mouth (9), and to the diameter of the needle (8), the puncture produced by the needle's passage through the plug will re-enclose completely and instantaneously once the needle has been withdrawn from the plug.

As previously stated, the plug must be forced into the interior of the reservoir mouth (9) due to the fact that its external radial dimensions are greater than the corresponding dimensions of the seat into which it must be inserted.

This negative allowance between the plug's (10) radial dimensions and the diameter of the reservoir mouth (9) is related closely to the kind of elastomer to be used, which elastomer must offer sufficient resistance to compression exerted upon it, inasmuch as it is essential that, once introduced into the reservoir mouth (9) the plug should remain there permanently, without shifting from its position, (other than through necessary outside intervention): indeed, neither must the plug shift as a result of thrust exercised upon it by the lubricant, and it must allow neither the outflow of lubricant nor the intrusion of dust, water or mud; moreover the plug must not shift,—as will be explained more fully below—, during that operation whereby the needle is introduced into it.

To this end it is desirable that the reservoir mouth (9) have a surface roughness, not excessive so as to produce an obstacle to the plug's introduction, neither insufficient, but such that it provides a degree of friction serving to maintain the stability of the plug's eventual position.

A first form of embodiment of the plug is illustrated in FIGS. 3a and 3b: the plug's (10) exterior has the form of a truncated cone with its greater base united to the equal base of a cylinder whose height is less than that of the truncated cone.

The plug's (10a) greater diameter is greater than the diameter of the reservoir mouth (9) while the plug's lesser diameter is less than the diameter of the reservoir mouth (9). Provision is made along the plug's axis for a blind circular aperture (11) which departs from the plug's external base (12) and proceeds axially for a distance less than the plug's total axial length. The diameter of the aperture (11) is not less than that of the needle (8) as provision is made for the needle (8) to pass through the plug by way of its being threaded through the channel (11). The channel's (11) function is that of facilitating the needle's passage through the plug by virtue of the fact that the needle has only to perforate a thickness of material less than that of the plug's entire axial length. The principal reason for this provision is that of meeting the need for avoiding that the needle, encountering a certain resistance while passing through the plug, should occasion a forward movement of the plug (10) into the reservoir.

A second form of embodiment of the plug is illustrated in FIGS. 4a and 4b. The plug (10b) is similar to plug (10a) having otherwise a small bush (14) of highly resistant material,—metal for example—, inserted into the aperture (11) and adherent to the cylindrical surface area of the aperture.

The function of this bush (14)—should the need become apparent—is to preclude any difficulty of passage through the plug for the needle (8) in the event that once inserted into the reservoir mouth (9), the radial compression of the said plug should occasion constriction of the aperture (11).

A third form of embodiment of the plug is illustrated in FIGS. 6a and 6b: the plug's (10c) exterior shape is similar to that of plug (10a) that is, a truncated cone united to a cylinder.

Provision is made along the plug's (10c) axis for a first blind circular aperture (15) which departs from the plug's external base (12) and proceeds a certain length along the axis, and a for a second blind circular aperture (16) which departs from the plug's internal base (13) and proceeds a certain length along the axis; the sum of the lengths of the two apertures (15 and 16) is less than the plug's total axial length, the plug thus showing a central solid portion (17).

The outermost portion of the aperture (15) is countersunk so as to facilitate the insertion of the needle (8). The diameter of the apertures (15 and 16) is not less than the diameter of the needle (8).

This third form of embodiment of the plug is equivalent in essence to the said first form of embodiment.

A fourth form of embodiment of the plug is illustrated in FIGS. 5a and 5b: its exterior shape being similar to that of the plugs in the previously illustrated embodiments.

The plug (10d) is furnished with an internal chamber (18) which communicates both with the external base (12) and with the internal base (13) by way of two respective circular apertures (19 and 20).

The chamber (18) is filled with an elastomer having a high degree of elastic deformability.

With this form of embodiment the elastomer which forms the outer part of the plug, and which has the higher degree of rigidity, has the principal function of responding to the force with which the plug is inserted into the reservoir mouth (9) with a resilient counterpressure, whilst the elastomer filling the chamber (18),—having the higher degree of elastic deformability—, serves as passage for the needle (8) and as re-enclosing agent for the aperture following withdrawal of the needle: thus two materials with differing characteristics are utilised so as to meet the two different needs.

The needle (8) comprises a thin rectilinear tube (21) supported by a shank (24) and provided with an oblique cutting edge, that is, as it were, fashioned from a cylinder intersected by a plane that is inclined with respect to the cylinder's axis.

The tube (21) is closed at its would-be point (22) and is furnished with one or more holes (23) positioned in close proximity to the said point, which place the interior channel of the tube in communication with the outside.

The needle,—as already established—, is introduced into the plug (10) and in being so introduced must inevitably exercise a certain force upon the plug; besides which, when the needle (8) is withdrawn from the plug it is necessary that the puncture produced by the needle should re-enclose by dint of the elastic quality of the elastomer of which the plug is made. With these necessities in mind, the needle's (8) point is furnished with an acute and appropriately sharpened cutting edge, while the exterior surface of the tube (21) is extremely smooth and slides freely (being made for example of fine guage polished stainless steel).

Moreover, the tube (21) must have the thinnest possible external diameter, whose dimension must also take account of the contrasting necessity that a suitably viscous lubricating oil must pass through the tube in the shortest possible time.

The form of embodiment illustrated in FIGS. 5a and 5b is one which allows the use of a larger guage needle, due both to the lower resistance offered to the needle's passage by the elastomer in the chamber (18) and to the greater efficiency with which this same elastomer re-encloses the puncture produced by the needle (8).

The point (22) is suitably enclosed in order both to lessen any resistance to the needle's penetration, and to keep laceration of the elastomer to a minimum, and further, to avoid the paring away of slivers of elastomer.

In fact, were the needle to have an open point it would in penetrating the elastomer drill out slivers which would inevitably obstruct the tube's hole during the air-suction, operation, and which would hinder the subsequent introduction of the oil.

Furthermore, in this event the plug itself would in consequence be left lacerated, rendering a perfect re-enclosure of the puncture produced by the needle quite impossible.

The needle's shank (24) communicates by turns with the suction apparatus (not illustrated) which provides for extraction of the air from the reservoir (7), and with the apparatus (not illustrated) from which the lubricating oil is sent to the interior of the reservoir (7).

It may be observed that during the operation whereby air is extracted and oil injected, a complete hermetic seal is maintained between the outer surface of the tube (21) and that part of the elastomer making contact with the said outer surface, this being due principally to the elastic quality of the elastomer of which the plug is made.

Illustrated in FIG. 7 are the means whereby the plug is introduced into the mouth of the lubricant reservoir. These means are applied particularly in the case of the reservoir mouth being slightly countersunk in order to favour the plug's easy entry.

Provision is made for a guide block (31) to be positioned correspondently to the reservoir mouth (9).

There is a through hole (34) located within the block (31), the said through hole (34) being of truncated-conical shape and whose greater diameter is greater than the greater diameter of the plug, and whose lesser diameter is less than, or equal to that of the reservoir mouth (9).

Provision is made around the lesser base of the hole (34) for a circular lip (33) which projects outwards and encircles the said lesser base of the hole. The shape of the lip (33) is complementary to that of the reservoir mouth's (9) countersunk extremity so that in marrying the lesser base of the hole (34) to the reservoir mouth (9) the lip (33) fits into the said countersunk extremity.

Provision is made further for a pushing agent (32) which runs the interior of the hole (34) and pushes on the plug, forcing it into the reservoir mouth (9).

The plug (10) is inserted into the opening of the hole (34) and is thence pushed by the action of the said pushing agent (32) through the hole (34) into the interior of the reservoir mouth (9). In passing from the greater base to the lesser base of the hole (34) the plug becomes compressed, hence on leaving the hole (34) it expands slightly and comes to rest in the interior of the reservoir mouth (9).

The means thus described are of optimum efficiency for introduction of the plug into the interior of the reservoir mouth (9).

For withdrawal of the plug at any time,—particularly after prolonged use of the track—, for example in order to change the plug itself, provision is made for means of the said withdrawal comprising a tapered shaft (40) furnished with a helicoidal thread (41) which is screwed corkscrew fashion along the plug's axis and, thus engaging the plug, is pulled until complete withdrawal of the plug is achieved.

Provision is made in an alternative form of embodiment in FIG. 2 for a special seat (9a) located in the reservoir mouth (9), being of a diameter greater than that of the reservoir (7).

The plug (10) is pushed into the set (9a) until it makes contact with the shoulder located at the bottom of the said seat (9a).

This form of embodiment serves,—should the need arise—, to preclude that possibility of the plug's being pushed into the interior of the reservoir (7) itself during the stage in which the needle is inserted.

The advantages provided by the process and means to which the invention herein described refers will be apparent from the foregoing descriptions.

It will be noted in particular that the reservoir (7) having been initially sealed, is then evacuated with its surrounding spaces (that is—the conduits (6) and the spaces enclosed by the coupling's surface areas (1a and 2a) ) of any air present therein, by way of the needle (8).

The lubricant is subsequently introduced into an air-free enclosure, and once the needle has been withdrawn, the reservoir and the aforementioned surrounding spaces are found to have been automatically filled, and the reservoir automatically sealed.

In this manner it is possible to obtain optimum filling of the reservoir and the aforementioned surrounding spaces, and to eliminate the need for a separate subsequent sealing operation.

Moreover one is bound to take note of the simplicity and cost-effectiveness of the plugs and their relative means to which the invention herein described refers-not to mention their extremely functional nature.

Furthermore, if at any time it is wished to add to or replace the lubricant in the reservoir (7) there is no need to withdraw the plug but, using the same plug, it is sufficient—having introduced the needle and extracted any air and/or spent lubricant—to inject the (new) lubricant.

Finally, it will be realised that those stages wherein the plug (10) is introduced into the reservoir mouth (9) and the needle (8) passed through the plug (10) can be carried out either successively or simultaneously; in the latter case the needle may serve as pushing agent for the introduction of the plug into the reservoir mouth. Or yet again one can envisage the needle,—having been previously passed through the plug—, being introduced with the plug,—as one—, into the reservoir mouth.(9).

Numerous modifications of a practical nature may be applied to the constructive details of the invention without there being in any way a deviation from the framework of protection afforded to the conceptual ideas behind the invention as claimed below.

What is claimed is:

1. Apparatus for filling and sealing a lubricant reservoir having interior wall means and located within the pivot element of lubricated turning pairs, in particular track link pivots and crawler track rollers, of the type including a plug fashioned from elastomeric material and insertable into the mouth of the lubricant reservoir to seal said reservoir, needle means for injecting lubricant into the reservoir insertable through the plug in such a way that its extremity gains access to the reservoir interior, said needle means being withdrawn from the plug following introduction of the lubricant into the reservoir, the plug and the needle means being embodied such that the puncture produced by the latter re-encloses upon withdrawal of the needle means by virtue of the elastic quality of the material from which the plug is made, the improvement comprising:

said plug being compressed upon insertion into said reservoir mouth, the outer surface of said plug defining means for preventing shifting of said plug in said reservoir mouth during insertion, or withdrawal of, said needle means into, or from, said inserted plug, said plug being retained in said reservoir mouth solely by the interaction of said reservoir wall means with said shifting preventing means of said plug outer surface and the radial forces resulting from said compression of said plug after insertion of the latter in said reservoir mouth.

2. The improvement of claim 1 wherein said plug includes at least one longitudinal blind aperture which extends from one of its bases, said aperture being of length less than the plug's axial length, and of diameter not less than that of the needle means used for injection of said lubricant.

3. The improvement of claim 1 wherein said needle means defines means for extracting air from said reservoir prior to introducing said lubricant into said reservoir.

4. The improvement of claim 1 wherein a discrete layer of material defining a bushing is disposed interiorly of, and in contact with, said aperture.

5. The improvement of claim 1 wherein said plug further includes a second blind cylindrical aperture concentric with said first aperature, said second aperture extending toward said first aperture, said first and second apertures being separated by a solid portion of said plug.

6. The improvement of claim 5 wherein said plug solid portion comprises an elastomeric material having a high degree of elastic deformability said solid portion being separate and discrete from said plug.

7. The improvement of claim 1 wherein one end of said plug comprises, in exterior configuration, a truncated cone and the opposite end of said plug comprises, in exterior configuration, a cylinder, the larger base of said cone configuration being united to said cylinder configuration and the height of said cylinder being less than the height of said cone.

8. The improvement of claim 1 wherein said needle means comprises a single thin tube having an obliquely cut closed extremity, said tube including at least one opening in its surface in close proximity to said closed extremity, whereby the interior of said tube communicates with the exterior of said tube.

9. The improvement of claim 1 further comprising means for forcibly inserting said plug within said reservoir mouth, said inserting means including a guide block positionable against said reservoir mouth, said guide block having an opening therethrough for receipt of said plug, said opening being in alignment with said reservoir mouth;

and means for pushing said plug through said guide block opening into sealing engagement with said reservoir mouth.

10. The apparatus for claim 9 wherein said guide block opening has a truncated conical cross-section, the greater diameter of said opening being greater than the plug's diameter, and the lesser diameter of said opening being less than the diameter of the reservoir mouth; and said guide block including means for aligning it with said reservoir mouth.

11. The improvement of claim 1 and further comprising means for withdrawing said plug after its insertion into said reservoir mouth, said withdrawing means comprising a shaft having helicoidal threads, whereby said shaft may be screwed into said plug and a pulling force subsequently applied thereto so that said plug can be extracted from said reservoir mouth.

* * * * *